United States Patent [19]

Cox

[11] Patent Number: 4,484,801

[45] Date of Patent: Nov. 27, 1984

[54] PANORAMIC LENS

[75] Inventor: Arthur Cox, Des Plains, Ill.

[73] Assignee: The United States of America as represented by the Secretary of the Navy, Washington, D.C.

[21] Appl. No.: 420,451

[22] Filed: Sep. 20, 1982

[51] Int. Cl.³ .............................................. G02B 13/06
[52] U.S. Cl. ................................................... 350/441
[58] Field of Search ........................................ 350/441

[56] References Cited

U.S. PATENT DOCUMENTS

| | | | |
|---|---|---|---|
| 3,240,113 | 3/1966 | Stechemesser et al. | 350/441 |
| 4,012,126 | 3/1977 | Rosendahl et al. | 350/441 |
| 4,395,093 | 7/1983 | Rosendahl et al. | 350/441 |

Primary Examiner—John K. Corbin
Assistant Examiner—Rebecca D. Gass
Attorney, Agent, or Firm—Robert F. Beers; Robert W. Adams; Robert J. Veal

[57] ABSTRACT

A panoramic lens grouping utilizes a number of negative and positive power lenses to provide 360° photography and projection capabilities. The lens grouping uses a hyperbolic mirror as its input or output, in the photographic or projection mode, respectively. The lenses of the group are selected to reduce the Petzval curvature introduced by the hyperbolic mirror. The lenses are arranged such that the negative power lenses are flanked by the positive power lenses. Provision is made for the use of an internal shutter in the spacing between lenses in the lens group.

6 Claims, 1 Drawing Figure

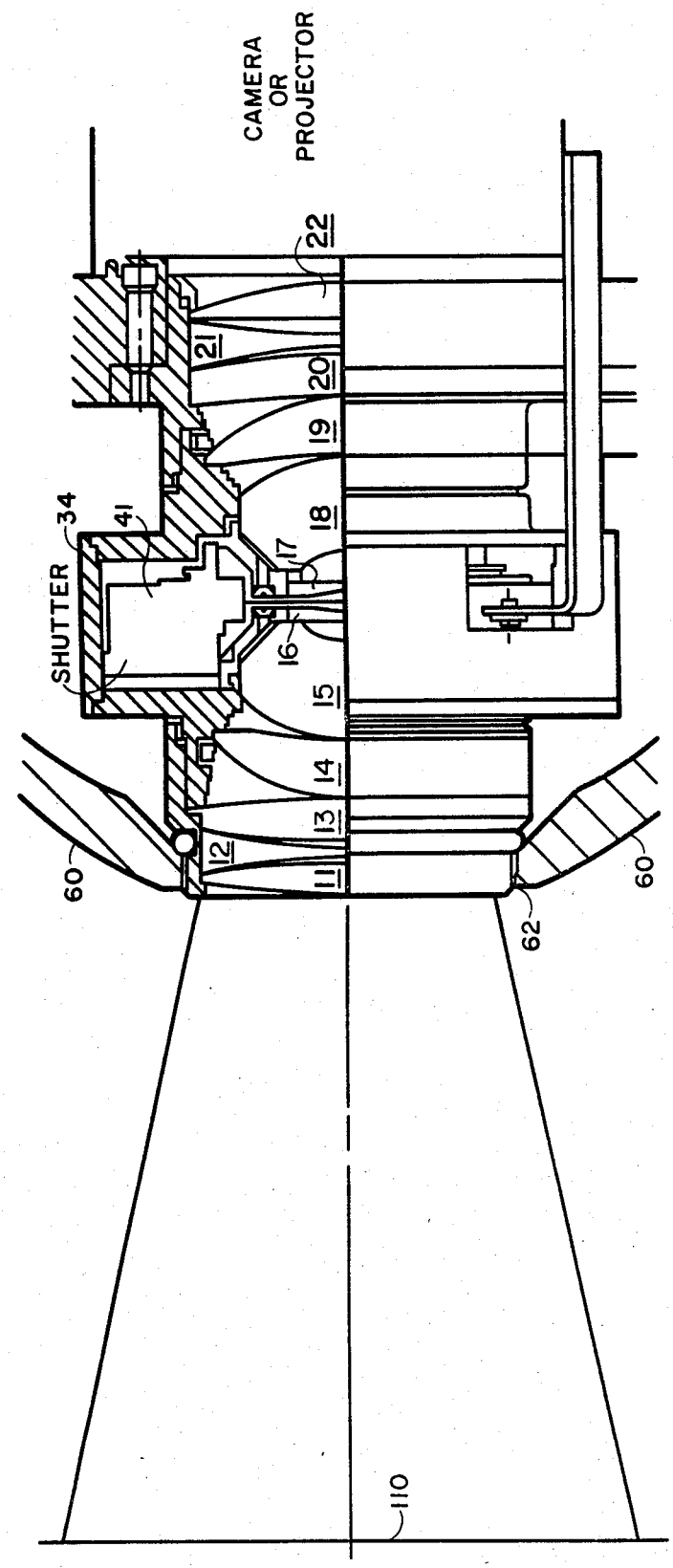

PANORAMIC LENS

BACKGROUND OF THE INVENTION

1. Field of the Invention

This invention relates generally to the field of optical image transfer. In particular, this invention relates to a wide angle image transfer system capable of transforming images of up to 360° in conjunction with the taking and projection of pictures.

2. Description of the Prior Art

In many training situations the presentation of an external environment is a necessity in order for the trainee to perceive visual cues and thereby learn to take actions or manipulate training equipment to maximum advantage for a given training situation. A particularly useful approach to realism in display is to generate a 350° wide-angle presentation to produce the effect of the observer being in the center of scene activity.

U.S. Pat. No. 4,012,126 by Gottfried R. Rosendahl and Wiley V. Dykes discloses an optical transfer system for 360° image transfer in which spaced primary and secondary hyperbolically surfaced mirrors are combined with a refractive lens system and are held in spaced relationship by a transparent envelope having inner and outer surfaces generated from the near focal point of the primary mirror. The primary mirror coincides with the entrance pupil of the system in order to avoid aberrations by the envelope within a pencil of rays originating from an object or image point and particularly between rays originating at different object or image points.

The lens system disclosed in the above patent was determined to be susceptible to damage from thermal shock and did not adequately deal with chromatic aberrations. In order to correct these deficiencies, U.S. patent application Ser. No. 265,874 by Gottfried R. Rosendhal and Wiley V. Dykes, filed May 21, 1981 now U.S. Pat. No. 4,395,093, disclosed a modified lens system incorporating four lens groups of positive and negative refracting power to achieve the required visual clarity. The modified lens utilizes a number of lenses which require rather exotic glasses, thus yielding a rather expensive apparatus.

SUMMARY OF THE INVENTION

The subject invention overcomes some of the disadvantages of the prior art in that it comprises a lens system for panoramic imagery which is capable of transforming visual images of up to 360° in conjunction with the taking and the projection of said visual images.

The present invention is a modification of the invention disclosed in U.S. Pat. No. 4,012,126; however, the present invention utilizes a plane mirror rather than a secondary hyperbolically surfaced mirror. Additionally, fewer individual lens elements are required by the present design and the required lenses are not of a particularly expensive glass. The present design comprises two groups of lens elements, each containing positive and negative refracting power lenses, the negative power lenses of each group proximate one another flanked by the positive lenses. Additionally, provision is made for the insertion of a shutter between the lens groups. The negative lenses are of optical quality fused silica to resist heat, since they are exposed to the greatest concentration of radiant energy.

It is an object of the present invention to provide a lens system for panoramic projection which is resistant to thermal damage.

Another object of the present invention is to provide such a lens system with sufficient visual clarity as to provide a viable training aid.

Another object is to provide a lens system for panoramic projection incorporating a better lens shutter.

Yet another object of the present invention is to provide a lens system in accordance with the above objects in a cost effective manner.

The features of the invention desired to be protected are set forth in the appended claims. The invention itself, together with further objects and advantages thereof, may best be understood by referring to the following description taken in conjunction with the appended drawing.

BRIEF DESCRIPTION OF THE DRAWING

The FIGURE illustrates the lens system by means of a cutaway view perpendicular to the optical axis.

DESCRIPTION OF THE PREFERRED EMBODIMENT

As noted hereinabove, prior lens systems have suffered two primary problems: intolerance to heat and/or high cost. The heat problem arises because the optical system is used both for picture taking and projection, and in the latter case the energy of a xenon arc lamp may be concentrated near one or more optical elements. Although most of the infra-red radiation is eliminated by a suitable filter, the energy flow is sufficiently intense that significant heating can occur. The cost problem arises because prior design used up to twenty-one lens elements in the refracting system, some of which required exotic glasses, thus the high cost.

Referring to the FIGURE, the previous hyperbolically surfaced mirror of the prior art has been retained as hyperbolically surfaced mirror 60 in the present invention. Also retained has been a transparent envelope 61, not shown, which is symmetrically generated about the near focal point of mirror 60.

The retention of mirror 60 has retained an inherent design problem. A deep convex reflecting hyperboloid, such as mirror 60, introduces a very strong positive Petzval curvature. This results in the image surface being strongly bent so that it is concave toward secondary mirror 110. A normal refracting lens has a positive Petzval curvature. A departure from any type normal refracting lens was therefore necessary to create a refracting system with sufficient negative Petzval curvature to balance the positive Petzval curvature of the hyperbolic mirror 60.

In the prior system, mirror 110 was a secondary hyperbolic mirror. The present design allows mirror 110 to be either a plane mirror or a spherical mirror. The use of a plane mirror has obvious manufacturing advantages and also reduces higher order overcorrected sagittal astigmatism by reducing the angles which ingoing rays make with the systems optical axis after reflection. Preferably mirror 110 is made of pyrex coated with 98% reflective aluminum, with an infinite radius of curvature on its reflecting side.

The refracting system uses two lens groups which are pseudo-symmetrical in that each group contains six lenses; however, the optical characteristics of each lens varies slightly from that of its symmetric counterpart with the exception of lenses 15 and 18. The optical data for each lens is shown in Table I.

In the embodiment shown, lenses 15, 16, 17 and 18 are of negative refractive power. Said lenses are also in the area of the greatest concentration of energy from the xenon arc lamp. Therefore, these four lenses are made from optical quality fused silica. The remaining lenses 11, 12, 13, 14, 19, 20, 21, and 22 are of positive refracting power and are made from standard optical glass. Thus the combination of the two lens groups yields a configuration physically symmetrical in which the negative power lenses are flanked along the optical axis by the positive power lenses.

A further novel feature of this lens design is that it allows the insertion of a shutter 41 between the lens elements. In the present embodiment, shutter 41 is positioned between the lens groups. The specific embodiment shown herein was designed for use with an electronically controlled shutter made by the Euling Company of Natich, Mass.

It is of major importance that the centering of the lens elements preceding and following shutter 41 be accurately maintained. For this reason the mechanical design was carried out in such a way that this centering did not depend on any physical characteristics of shutter 41. Shutter 41 is, in fact, mounted in a precisely machined cage 34 which supports both lens groups.

TABLE I

OPTICAL DATA

| Element | Radius (in) | Thickness (in) | Separation (in) | Glass | Coating |
|---|---|---|---|---|---|
| 110 | — | 0.500 | | Pyrex | 98% Refl AL |
| | ∞ | | 5.282 | | |
| 11 | 12 | 0.165 | | LA 5F5 | MgF$_2$ |
| | −12 | | 0.050 | | |
| 12 | −5.601 | 0.095 | | SF6 | MgF$_2$ |
| | +3.909 | | 0.020 | | |
| 13 | 4.602 | 0.285 | | LAKN9 | MgF$_2$ |
| | −8.861 | | 0.0095 | | |
| 14 | 1.2724 | 0.3804 | | LAKN9 | MgF$_2$ |
| | +4.674 | | 0.0095 | | |
| 15 | 1.0872 | 0.6657 | | Fused Silica | Hi-eff Anti-reflec |
| | +0.4507 | | 0.1200 | | |
| 16 | 18.594 | 0.076 | | Fused Silica | Hi-eff Anti-reflec |
| | +1.805 | | 0.1250 | | |
| 17 | −1.442 | 0.076 | | Fused Silica | Hi-eff Anti-reflec |
| | −5.017 | | 0.1900 | | |
| 18 | −0.4507 | 0.6657 | | Fused Silica | Hi-eff Anti-reflec |
| | −1.0872 | | 0.0095 | | |
| 19 | −4.606 | 0.3804 | | LAKN9 | MgF$_2$ |
| | −1.3378 | | 0.0095 | | |
| 20 | −9.215 | 0.285 | | LAKN9 | MgF$_2$ |
| | −4.677 | | 0.0408 | | |
| 21 | −3.734 | 0.095 | | SF6 | MgF$_2$ |
| | +6.003 | | 0.100 | | |
| 22 | −100.000 | 0.250 | | LAKN9 | MgF$_2$ |
| | −3.169 | | — | | |

Referring to the FIGURE, hyperbolically surfaced mirror 60 is held in spaced relationship by transparent envelope 61 with plane mirror 110. Mirror 60 has a central aperture 62 which is aligned with mirror 110 such that the optical path of light through the system via mirror 110 is through aperture 62. Mounted within aperture 62 is cage 34, which in the illustrated embodiment is composed of a number of precision machined components whose configuration was determined in accordance with the parameters of the lenses and shutter 41.

Immediately within cage 34 is lens 11, a lens of positive refracting power, with the optical parameters set forth in Table I. Lenses 12, 13, and 14 are held in fixed alignment by housing 34, each of said lenses also being of positive power. The first lens group is completed by negative power lenses 15 and 16 which are made of fused silica elements.

In the illustrated embodiment, cage 34 provides for a space of 0.1900 inches between the first lens group and the second lens group to accommodate shutter 41. Negative power lenses 17 and 18 follow the shutter spacing and positive power lenses 19, 20, 21, and 22 complete the second lens group. Cage 34 is adapted such that it may be attached to either a camera or a projection device.

It should be noted that the well established procedure used to reduce Petzval curvature is to trace a paraxial ray from an object point in the axis of the system so that this ray meets surfaces of positive power at comparatively large distances from the system axis until it meets surfaces of negative power at points that are closer to the axis. In some cases a field flattener, a negative power surface located near the focal plane, is used. However, since film for recording images is to be located at the focal plane of this system and since the condenser system necessary for using the device in the projection mode would have to overcome the negative power of a field flattener, the use of such a field flattener was precluded from the design configuration.

While a particular embodiment of the invention has been shown and described herein, it is not intended that the invention be limited to such disclosure, but that changes and modifications can be made and incorporated within the scope of the appended claims.

What is claimed is:

1. An optical system for 360° annular image transfer comprising:
   a hyperbolically surfaced mirror having a near and far focal point and an apex at which is located a central aperture;
   a plane mirror having its surface perpendicular to the optical axis of said hyperbolically surfaced mirror;
   an envelope of optically suitable transparent material having an outer and inner surface generated in symmetry from said near focal point of said hyperbolically surfaced mirror and attached to said hyperbolically surfaced mirror and said plane mirror to hold the same in spaced axial symmetry;
   a refractive lens system of negative lens elements flanked by positive lens elements;
   said hyperbolically surfaced mirror and said plane mirror and said lens system constituting a total optical system having an entrance pupil; and
   said mirrors being faced with the mirrored surfaces toward each other and held in a spaced relationship by said envelope such that said entrance pupil of said total optical system coincides with the near focal point of said hyperbolically surfaced mirror.

2. The optical system of claim 1, wherein said refractive lens system comprises:
   a first lens group having a plurality of negative and positive lens elements;
   a second lens group having a plurality of negative and positive lens elements; and means for housing said lens groups in fixed spatial relationship to one another such that they are proximate one another along the optical axis.

3. The optical system of claim 2, further comprising shutter means secured to said housing means in fixed relationship between said lens groups.

4. The optical system of claim 3, wherein said first lens group comprises:
- a first lens of positive refracting power centered on said optical axis and held within said aperture of said hyperbolically surfaced mirror by said housing means;
- a second lens of positive refracting power centered on said optical axis and held in fixed relation to said first lens by said housing means;
- a third lens of positive refracting power centered on said optical axis and held in fixed relation to said second lens;
- a fourth lens of positive refracting power centered on said optical axis and held in fixed relation to said third lens;
- a fifth lens of negative refracting power centered on said optical axis and held in fixed relation to said fourth lens; and
- a sixth lens of negative refracting power centered on said optical axis and held in place by said housing.

5. The optical system of claim 4, wherein said second lens group comprises:
- a seventh lens of negative refracting power centered on said optical axis proximate said sixth lens fixedly held by said housing means;
- an eighth lens of negative refracting power centered on said optical axis and held proximate said seventh lens by said housing means;
- a ninth lens of positive refracting power centered on said optical axis and held proximate said eighth lens by said housing means;
- a tenth lens of positive refracting power centered on said optical axis and held proximate said ninth lens by said housing means;
- an eleventh lens of positive refracting power centered on said optical axis and held proximate said tenth lens by said housing means; and
- a twelfth lens of positive refractive power centered on said optical axis and held proximate said eleventh lens by said housing means.

6. The optical system of claim 1, wherein said negative lens elements are made of optical quality fused silica.

* * * * *